US010226885B2

(12) United States Patent
Debruin et al.

(10) Patent No.: US 10,226,885 B2
(45) Date of Patent: Mar. 12, 2019

(54) POROUS INSERT FOR NOZZLE OF AN INJECTION MOLDING SYSTEM

(71) Applicant: IMFLUX INC., Hamilton, OH (US)

(72) Inventors: Frank Gustaaf Debruin, Grand Rapids, MI (US); Chow-Chi Huang, West Chester, OH (US); Michael Thomas Dodd, Walton, KY (US)

(73) Assignee: IMFLUX, INC., Hamilton, OH (US)

( * ) Notice: Subject to any disclaimer, the term of this patent is extended or adjusted under 35 U.S.C. 154(b) by 132 days.

(21) Appl. No.: 15/448,195

(22) Filed: Mar. 2, 2017

(65) Prior Publication Data

US 2017/0259479 A1   Sep. 14, 2017

Related U.S. Application Data

(60) Provisional application No. 62/303,016, filed on Mar. 3, 2016.

(51) Int. Cl.
| | |
|---|---|
| *B29C 45/20* | (2006.01) |
| *B29C 45/17* | (2006.01) |
| *B29C 45/63* | (2006.01) |
| *B08B 3/02* | (2006.01) |
| *B08B 3/08* | (2006.01) |
| *B08B 5/02* | (2006.01) |
| *B08B 9/00* | (2006.01) |
| *B29K 105/00* | (2006.01) |

(52) U.S. Cl.
CPC .......... *B29C 45/1736* (2013.01); *B08B 3/02* (2013.01); *B08B 3/08* (2013.01); *B08B 5/02* (2013.01); *B08B 9/00* (2013.01); *B29C 45/1753* (2013.01); *B29C 45/20* (2013.01); *B29C 45/63* (2013.01); *B29K 2105/0067* (2013.01); *B29K 2995/0065* (2013.01)

(58) Field of Classification Search
None
See application file for complete search history.

(56) References Cited

U.S. PATENT DOCUMENTS 5,385,462 A   1/1995   Kodama et al.

FOREIGN PATENT DOCUMENTS

| DE | 4237174 A1 | 5/1994 |
|---|---|---|
| JP | S6143532 A | 3/1986 |
| JP | H057423 U | 2/1993 |

(Continued)

OTHER PUBLICATIONS

International Search Report and Written Opinion, International Application No. PCT/US2017/020424, dated Sep. 14, 2017.

*Primary Examiner* — Eric W Golightly
(74) *Attorney, Agent, or Firm* — Marshall, Gerstein & Borun LLP

(57) ABSTRACT

A nozzle assembly for an injection molding system has a nozzle adapter with one or more vent holes therein. A porous metal insert is provided in fluid communication with at least one of the vent holes. The porous metal insert is also in fluid communication with a flow channel through the nozzle assembly. As molten polymeric material advances through the flow channel from a barrel to a mold assembly, gases entrained in the molten polymeric material are vented through the porous metal insert and escape through the one or more vent holes. Pressurized air may be introduced through the vent holes, such as by one or more blow-back modules, to unclog pores of the one or more porous metal inserts between shots of the injection molding system.

3 Claims, 25 Drawing Sheets

(56) References Cited

FOREIGN PATENT DOCUMENTS

| JP | H06293050 A | 10/1994 |
|---|---|---|
| JP | H11170320 A | 6/1999 |
| JP | 2000061605 A | 2/2000 |

POROUS INSERT FOR NOZZLE OF AN INJECTION MOLDING SYSTEM

CROSS-REFERENCE TO RELATED APPLICATION

This application is the non-provisional, and claims the benefit of the filing date, of U.S. Provisional Application No. 62/303,016, filed Mar. 3, 2016, which is hereby incorporated herein by reference.

FIELD OF THE INVENTION

The present application relates generally to the venting of gases from molten polymeric resin from injection molding systems and, more particularly, to the use of a porous metal insert in a nozzle of an injection unit for an injection molding system.

BACKGROUND OF THE INVENTION

While there can be many contributing factors to defects in injection molded articles, trapped gases within a mold cavity is often at least a significant cause. Part quality shortcomings that can be attributed to trapped gases include short shots, inconsistent distribution of park weight, flash (particularly in thin-walled parts), sink, air bubbles, black spots, and warpage. Trapped gases entrained in molten resin can also ignite in the mold cavity, causing charring to regions of the molded part.

Various methodologies have been employed in conventional injection molding systems to vent gases during the injection molding process. For instance, ventilation channels may be built into the walls of a mold cavity, vent plugs made of porous metals, and negative pressure or vacuum assist methodologies have been utilized. However, these methodologies require costly modifications to existing molds or customization of molds during their initial manufacture so as to provide effective venting. It would be desirable to provide an injection molding system that achieved adequate venting of gases from molten polymeric resin as the molten material is being introduced to the mold cavity, thereby reducing or eliminating the need to provide extensive venting in the mold itself.

By venting gas upstream of the mold cavity, an added advantage is that molten resin introduced to, and filling, the mold cavity has less gases entrained therein. Since gas entrained in the molten resin displaces the molten resin, such entrained gas can result in the delivery of less actual molten resin than desired.

SUMMARY OF THE INVENTION

An injection molding system of the present disclosure includes a nozzle having an insert made of a porous metal. For instance, PORCERAX II (TRADEMARK), produced by Sintokogio Co., Ltd. of Nagoya-City, Japan, and distributed by International Mold Steel, Inc. of Florence, Ky., is a machineable porous metal that can withstand the pressures and temperatures to which a nozzle of an injection molding system is exposed, while permitting expulsion of gases that have built up in the molten polymeric resin material while that material was heated and actuated toward the nozzle by the screw of the injection molding system. This elimination of gases prior to injection of the molten polymeric resin material into the mold cavity results in improved control of resin temperature and viscosity, which are critical factors in avoiding defects in parts commonly attributable to trapped gases.

Venting in the nozzle of an injection molding system can also be more expedient than venting through the walls of a mold, inasmuch as the molten polymeric resin is more concentrated in the nozzle. Venting gases from the nozzle, upstream of the mold cavity, also achieves more thorough venting, as there is a lower likelihood of pockets of gases being isolated from vent holes and failing to vent.

An additional benefit of providing a porous metal insert in the nozzle of an injection molding system is that it provides a venting location that is sufficiently localized to facilitate a blow-back of air from outside of the nozzle between shots. Blowing air back through the porous metal insert between shots serves to help clear resin residue from the pores, helping to prevent resin build-up, and eventual clogging, of the vent pores.

An aspect of the present disclosure is the selective securement of one or more porous metal inserts in a nozzle of an injection molding system via one or more set screws, which facilitates replacement of the porous metal inserts in the event of clogging that cannot be reversed through blow-back or other cleaning or unclogging techniques that might be performed with the porous metal insert(s) in place in the nozzle.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

While porous metal has been used in vented walls of mold cavities in injection molding systems, venting entrained gases from molten polymeric resin upstream of the mold cavity has several advantages. The embodiments of the present disclosure provide an economical solution to modifying an injection molding system to enable effective venting of entrained gases from molten polymeric resin. By employing a porous metal insert between a check ring and the barrel, such as in a nozzle of an injection mold system, gases entrained in the molten polymeric material in the barrel of the injection system can be vented before the molten polymeric resin is injected into the mold cavity.

Figure 1:
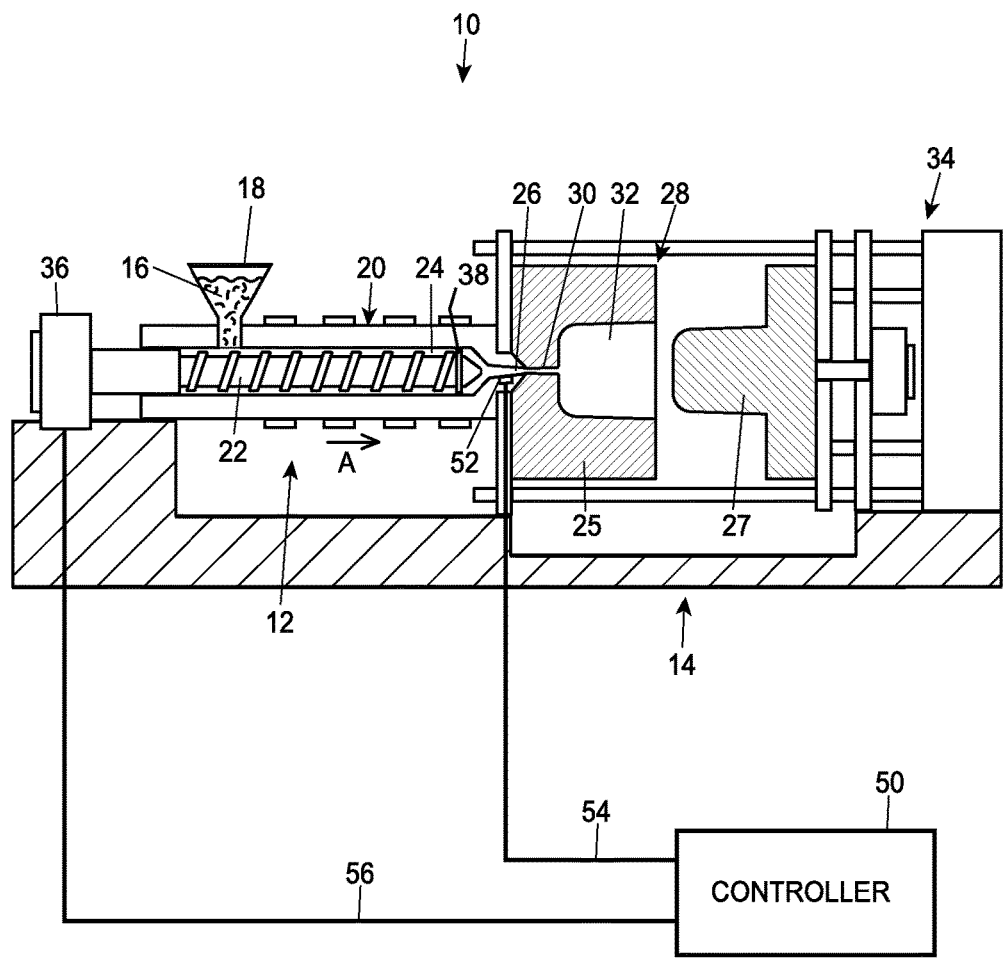
FIG. 1 is a front elevation view of an injection molding system.

Referring to the figures in detail, FIG. 1 illustrates an exemplary injection molding apparatus 10 for producing injection molded parts in high volumes (e.g., a class 101 or 30 injection mold, or an "ultra high productivity mold"). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28 via one or more gates. A check ring 38 is provided within the barrel toward a tip end of the reciprocating screw 22. The check ring 38 is coupled (e.g., attached) to a portion of the reciprocating screw 22, preferably at a position proximate a tip end of the screw 22. The check ring 38 is generally configured to prevent, or at least limit, a backflow of molten thermoplastic material 24 from flowing in a direction from the nozzle 26 toward the hopper 18. The molten thermoplastic material 24 may be injected through a gate 30, which directs the flow of the molten thermoplastic material 24 to the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 freezes, i.e., solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a sensor 52, located in the vicinity of the nozzle 26, and a screw control 36. The controller 50 may include a microprocessor, a memory, and one or more communication links. The controller 50 may also be optionally connected to a sensor 53 located proximate an end of the mold cavity 32. This sensor 32 may provide an indication of when the thermoplastic material is approaching the end of fill in the mold cavity 32. The sensor 32 may sense the presence of thermoplastic material by optically, pneumatically, mechanically or otherwise sensing pressure and/or temperature of the thermoplastic material. When pressure or temperature of the thermoplastic material is measured by the sensor 52, this sensor 52 may send a signal indicative of the pressure or the temperature to the controller 50 to provide a target pressure for the controller 50 to maintain in the mold cavity 32 (or in the nozzle 26) as the fill is completed. This signal may generally be used to control the molding process, such that variations in material viscosity, mold temperatures, melt temperatures, and other variations influencing filling rate, are adjusted by the controller 50. These adjustments may be made immediately during the molding cycle, or corrections can be made in subsequent cycles. Furthermore, several signals may be averaged over a number of cycles and then used to make adjustments to the molding process by the controller 50. The controller 50 may be connected to the sensor 52, and/or the sensor 53, and the screw control 36 via wired connections 54, 56, respectively. In other embodiments, the controller 50 may be connected to the sensors 52, 53 and screw control 36 via a wireless connection, a mechanical connection, a hydraulic connection, a pneumatic connection, or any other type of communication connection known to those having ordinary skill in the art that will allow the controller 50 to communicate with both the sensors 52, 53 and the screw control 36.

Figure 2:
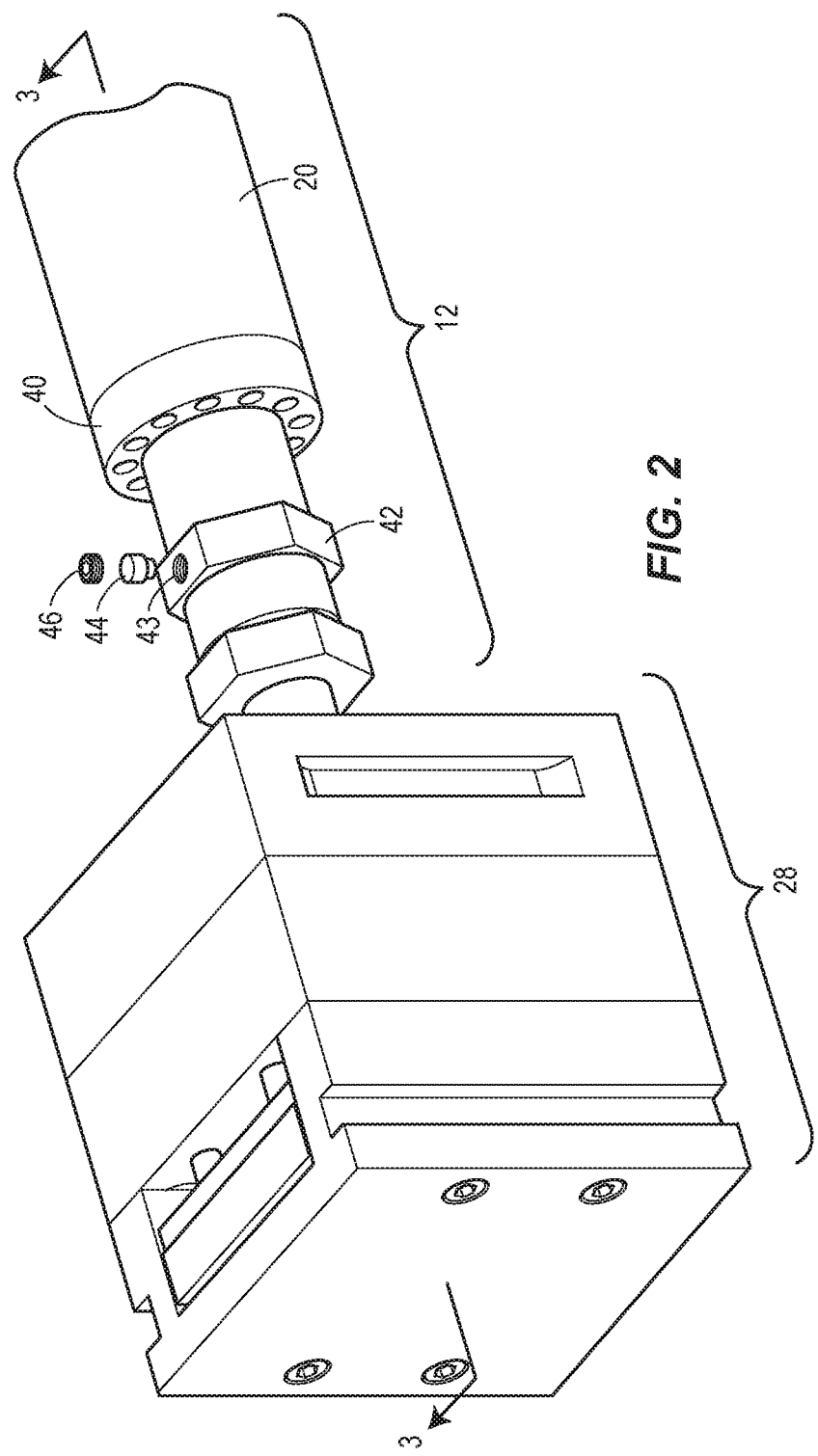
FIG. 2 is an orthogonal view of a portion of an injection system and a mold assembly of an injection molding system, illustrating (exploded from the injection system) a porous metal insert and retention screw for use in a nozzle adapter of the injection system.

Turning to FIG. 2, a region of the injection molding apparatus 10 is illustrated, with the mold 28 at the lower left and a portion of the injection system 12 at the upper right in the drawing figure. The heated barrel 20 is provided with a barrel end cap 40. A nozzle adapter 42 projects from the barrel end cap 40. A vent aperture 43 is provided in the nozzle adapter 42. The vent aperture 43 is internally threaded along at least a portion thereof, and receives a porous metal insert 44 therein, which is locked in place by a hollow securement screw 46. While a single vent aperture 43 is illustrated, it is understood that the nozzle adapter 42 may be provided with a plurality of vent apertures 43, each having a porous metal insert 44 secured therein. Each of the at least one vent apertures defines a passageway in a wall of the nozzle assembly intermediate the first and second opening, and each of the at least one passageways extends from an inlet at the flow channel of the nozzle assembly (i.e., at the flow channel 45 of the nozzle adapter 42) to an outlet at an exterior of the nozzle assembly.

Figure 3:
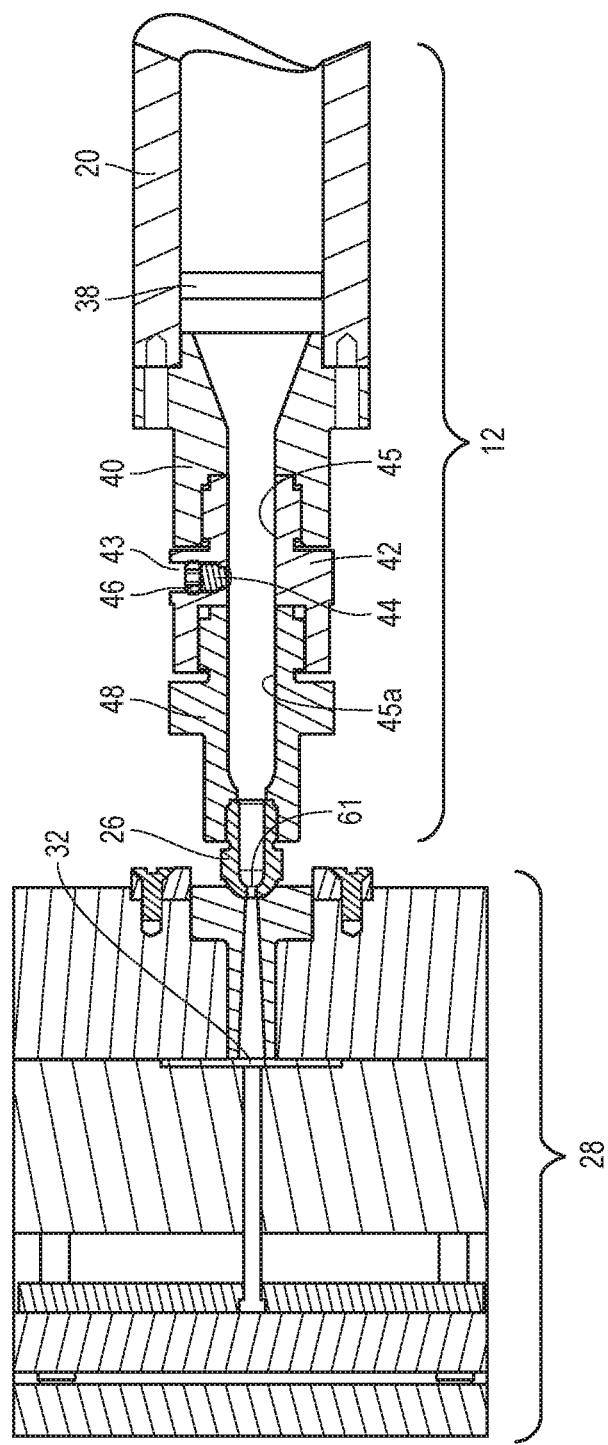
FIG. 3 is a cross-sectional view taken along lines 3-3 of FIG. 2, but illustrating the porous metal insert secured in place in the nozzle adapter by the retention screw.
Figure 4:
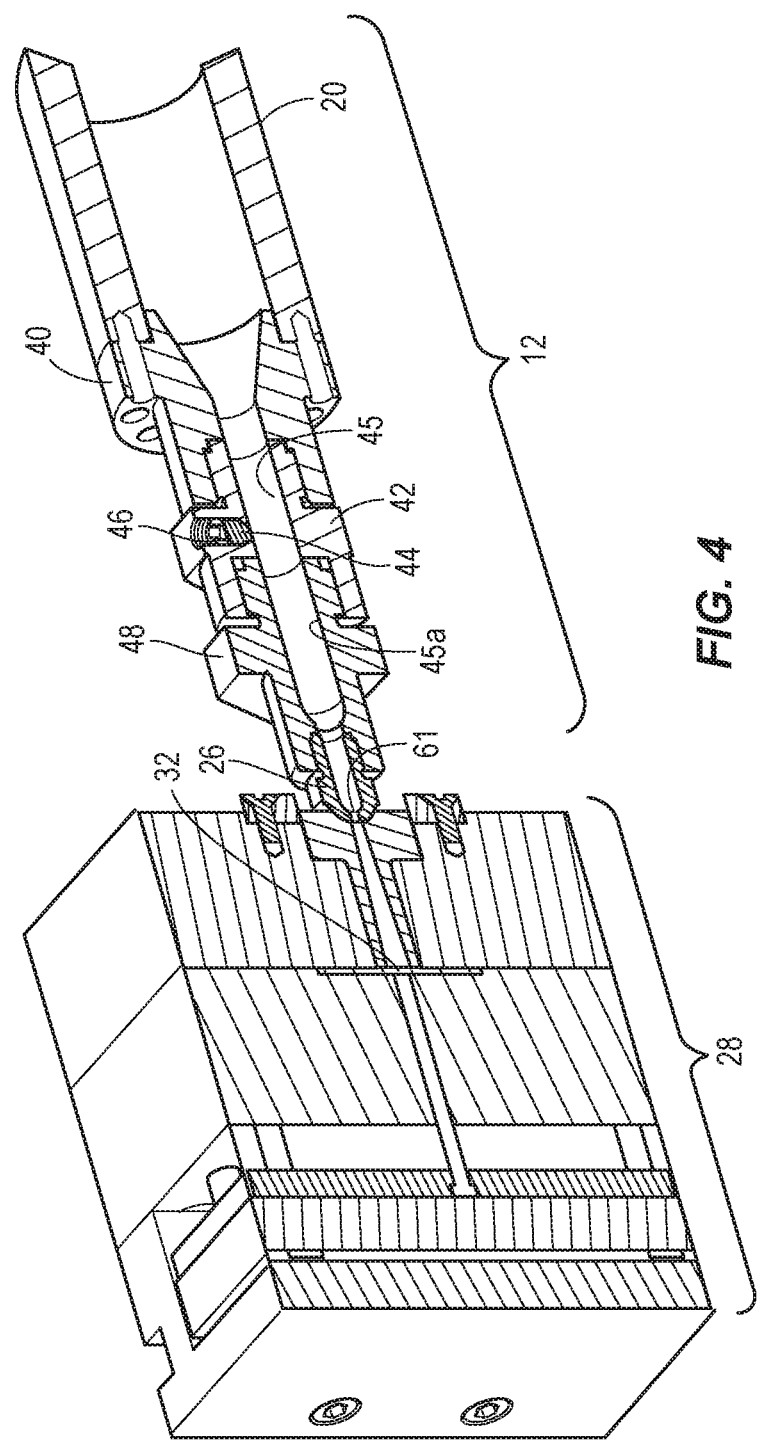
FIG. 4 is an orthogonal cross-sectional view of the same cross-section illustrated in FIG. 3.
Figure 5:
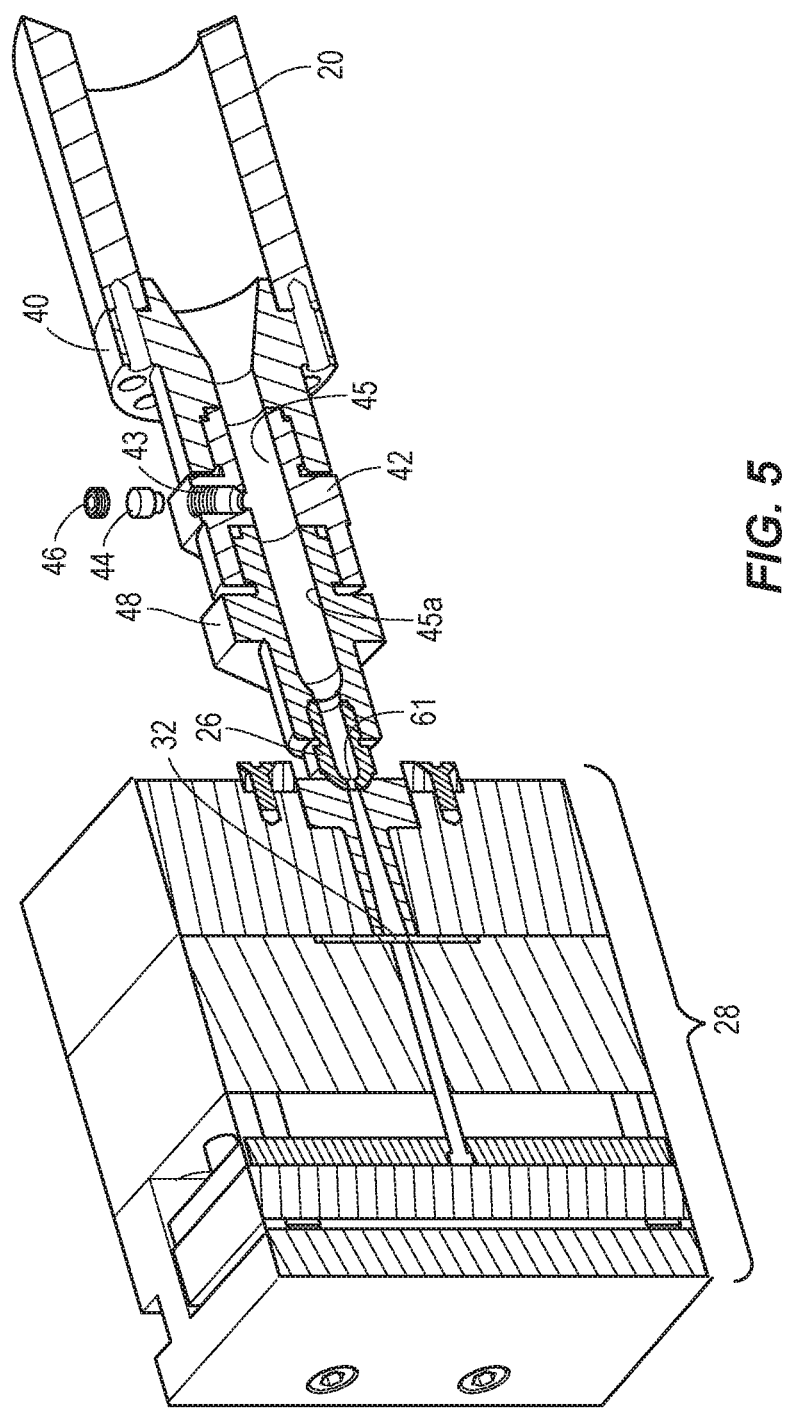
FIG. 5 is an orthogonal cross-sectional view similar to that of FIG. 4, but illustrating the porous metal insert and retention screw exploded from the injection system.

As illustrated in the cross-sectional views of FIGS. 3 and 4, the vent aperture 43 extends sufficiently deep into the nozzle adapter 42 such that the porous metal insert 44, when secured within the vent aperture 43, is in direct communication with a flow channel 45 of the nozzle adapter 42. The flow channel 45 has a first opening that is in selective fluid communication with a source of molten polymeric resin or like material, such as the hopper 18 and heated barrel 20 (also referred to herein simply as barrel 20).

The nozzle adapter 42 is provided between the barrel end cap 40 and a nozzle body 48 having a nozzle 26 provided at an end thereof. While the embodiments illustrated in the drawings show the nozzle adapter 42 as a distinct component from the nozzle body 48, the nozzle adapter 42 is considered part of what is referred to herein as the nozzle assembly, and could be formed integrally with the nozzle body 48 and still be considered within the scope of the appended claims. The nozzle body 48 has a flow channel 45*a* therein that is coaxial of the flow channel 45 of the nozzle adapter 42, which leads to an opening 61 in the nozzle 26. The opening 61 of the nozzle 26 effectively serves as a second opening of the flow channel 45*a* (which, together with the flow channel 45 of the nozzle adapter, serves as a flow channel of what is referred to herein as a nozzle assembly). The second opening is in fluid communication with at least one of the mold cavity 32, a gate, a runner, or a manifold of the injection molding system.

Figure 6:
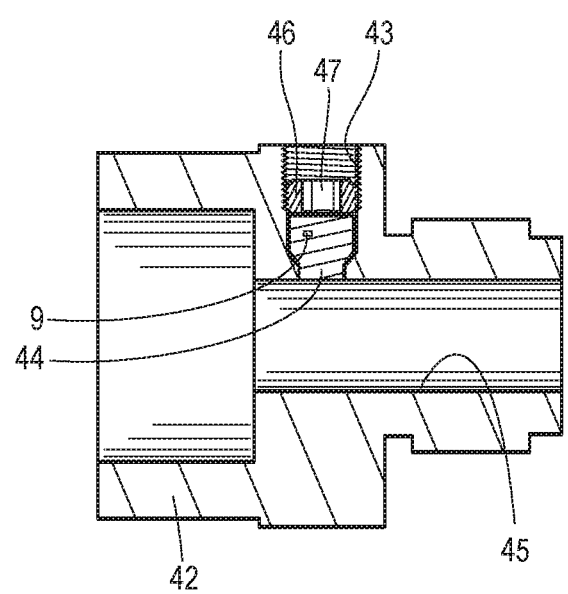
FIG. 6 is an enlarged cross-section view of a nozzle adapter having a porous metal insert secured in a vent aperture therein by a retention screw.
Figure 7:
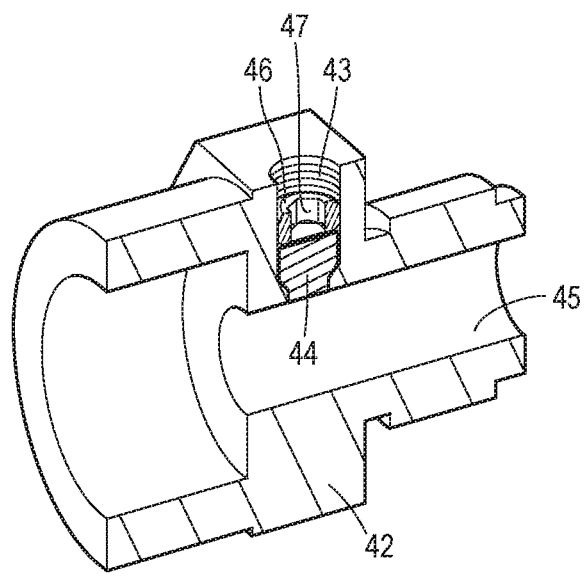
FIG. 7 is an orthogonal cross-section view of the same cross-section illustrated in FIG. 6.
Figure 8:
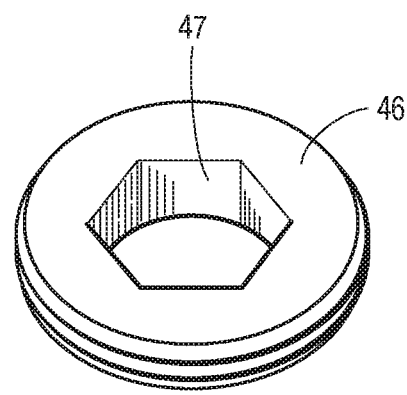
FIG. 8 is an orthogonal view of a retention screw that can be used to secure a porous metal insert in an aperture in a nozzle adapter of an injection system.
Figure 9:
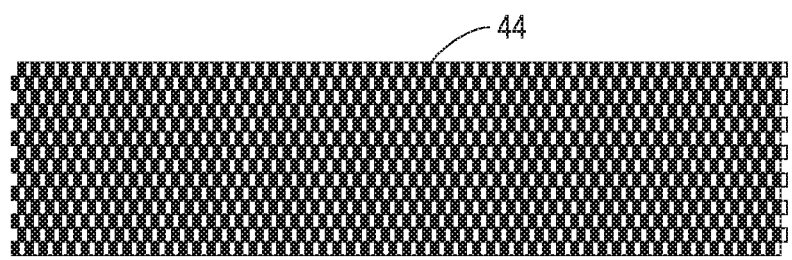
FIG. 9 is an enlarged view of a small rectangular region of a porous metal insert, such as the region designated by the dashed rectangle designated by reference number 10 in FIG. 6.

As best seen in FIGS. 6-8, the securement screw 46 has a polygonal (preferably square or hexagonal) socket or opening 47 therethrough to facilitate tightening the securement screw 46 within the vent aperture 43 using a head of a securement tool such as an Allen wrench or hex key (not shown) that can be received in the socket or opening 47, which can also be used to remove the securement screw 46 for ease of replacement of the porous metal insert 44, thus rendering the porous metal insert 44 removable. The opening 47 through the securement screw 46 also cooperates with the vent aperture 43 to serve as a vent passageway from the porous metal insert 44 to an exterior of the nozzle assembly.

The porous metal insert 44 is preferably a pre-hardened sintered, porous metal such as PORCERAX II (TRADEMARK), available from International Mold Steel, Inc. of Florence, Ky. The porous metal insert 44 may have an average pore size in a range of 5 μm to 25 μm, preferably with an average pore size of 7 μm or 20 μm.

The pores of the porous metal insert 44, which are shown in the enlarged view of the region designated as 9 in FIG. 6, permit gases entrained in molten polymeric material within the heated barrel 40 and flow channel 45 to escape through the porous metal insert 44. The gases are then vented through the polygonal opening 47 in the securement screw 46, and through the vent aperture 43, to an exterior of the nozzle. The vented gases may further be exhausted to a fume hood (not shown), fan, or other gas mitigation device.

By providing venting in the injection system 12 as opposed to venting gases after those gases have already reached the mold cavity, no marks that might be imparted to a molded part by venting structure within a mold cavity are made, because the need for such venting structure in the mold cavity is avoided.

A method of removing a porous metal insert 44, such as for the purpose of replacing or cleaning a porous metal insert 44 that has become clogged, includes removing the securement screw 46 from the vent aperture 43 by inserting a head of a securement tool such as an Allen wrench or hex key in the socket or opening 47 of the securement screw 46 and rotating the securement tool, thereby exposing the porous metal insert 44, then withdrawing the exposed porous metal insert from the vent aperture 43. The porous metal insert 44 may then be replaced with a new porous metal insert 44, or cleaned with a suitable fluid or cleaning agent for clearing the clogged pores of the porous metal insert 44. The fluid or cleaning agent may be a solvent or propellant, in a gas phase, a liquid phase, or a hybrid. A solvent-based or solventcontaining degreaser, which may or may not include surfactants and/or alkaline washing agents, is an example of a suitable cleaning agent.

Blow-Back Module

Figure 10:
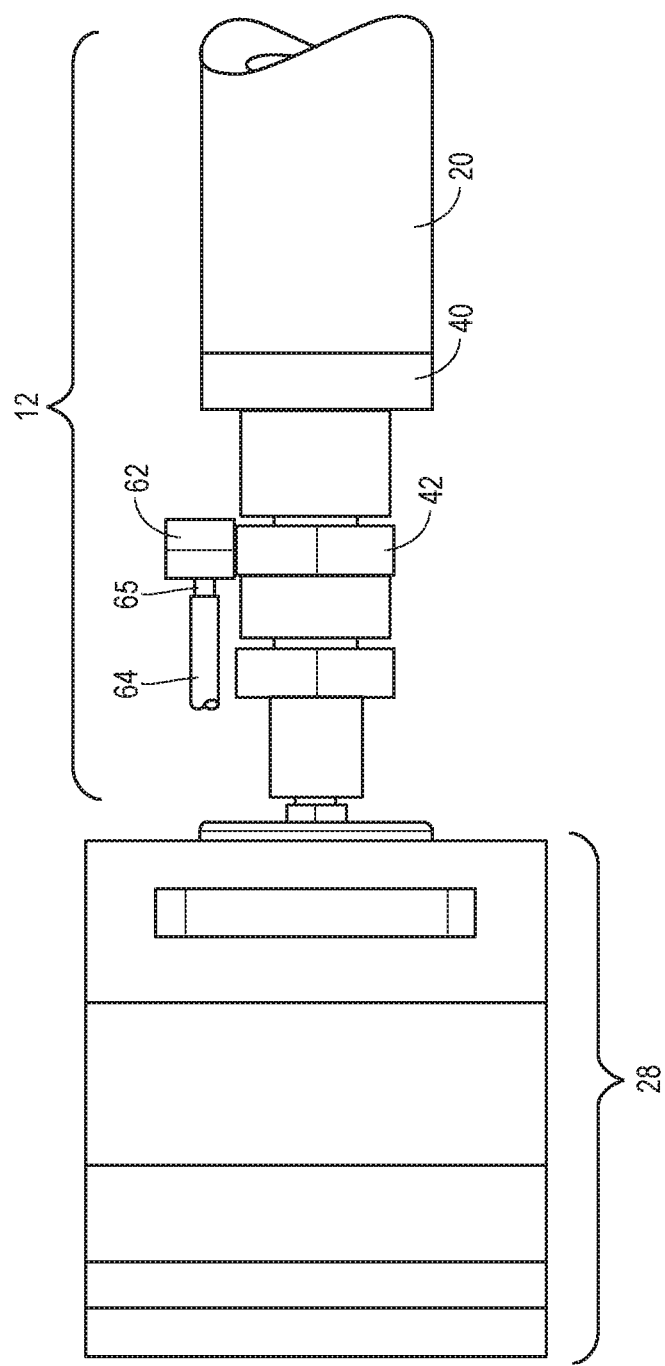
FIG. 10 is a front plan view of a portion of an injection system and a mold assembly of the injection molding system, with a blow-back module associated with the aperture of the nozzle adapter for purging the porous metal insert between shots of the injection molding system.
Figure 11:
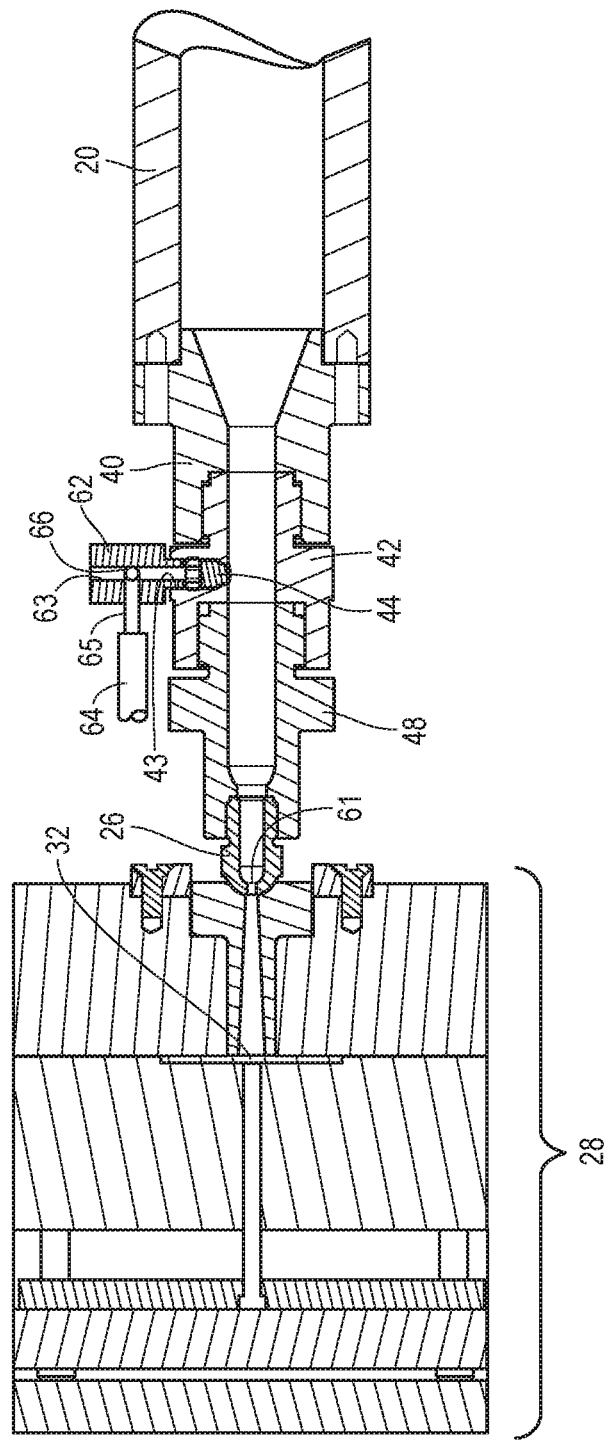
FIG. 11 is a cross-section of the portion of the injection system and mold assembly of FIG. 10, with blow-back module.
Figure 12:
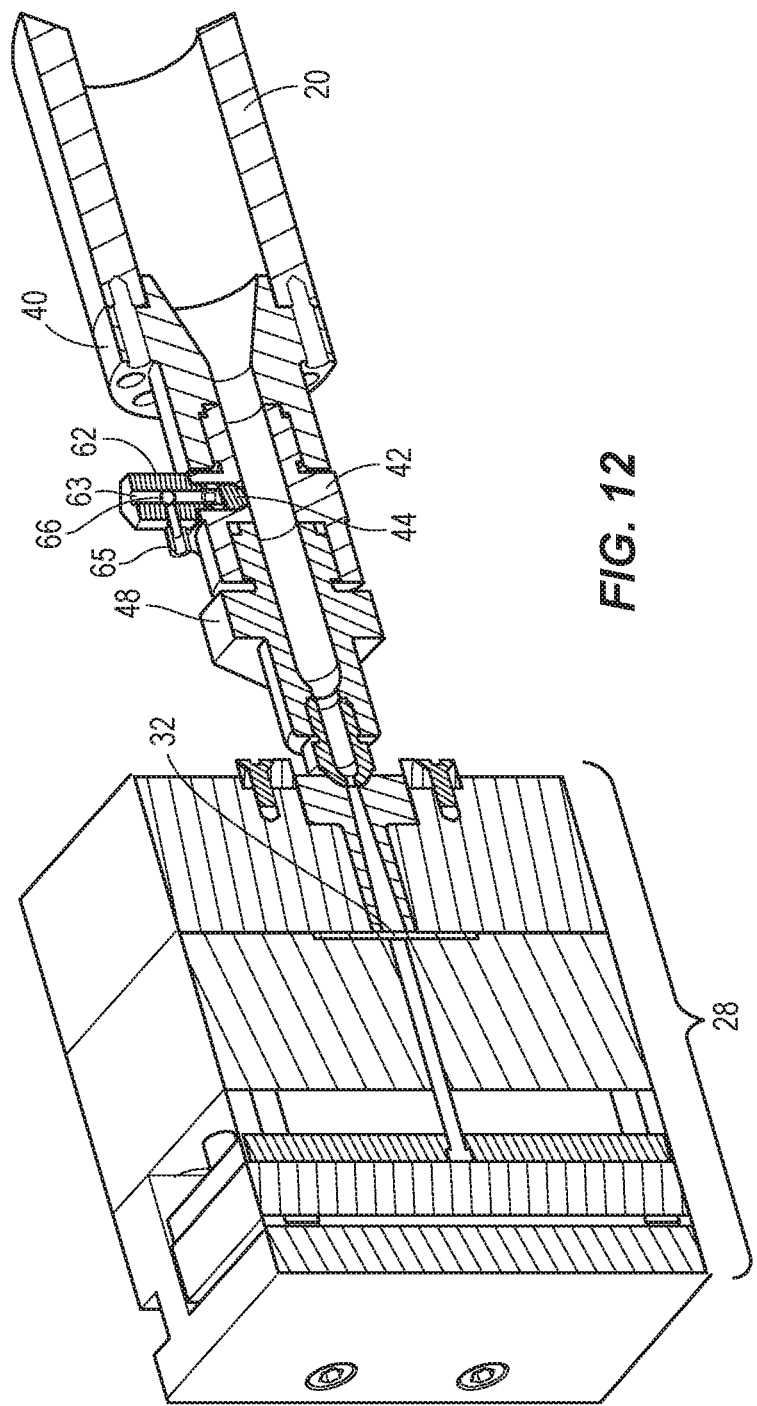
FIG. 12 is an orthogonal view of the cross-section of FIG. 11.
Figure 13:
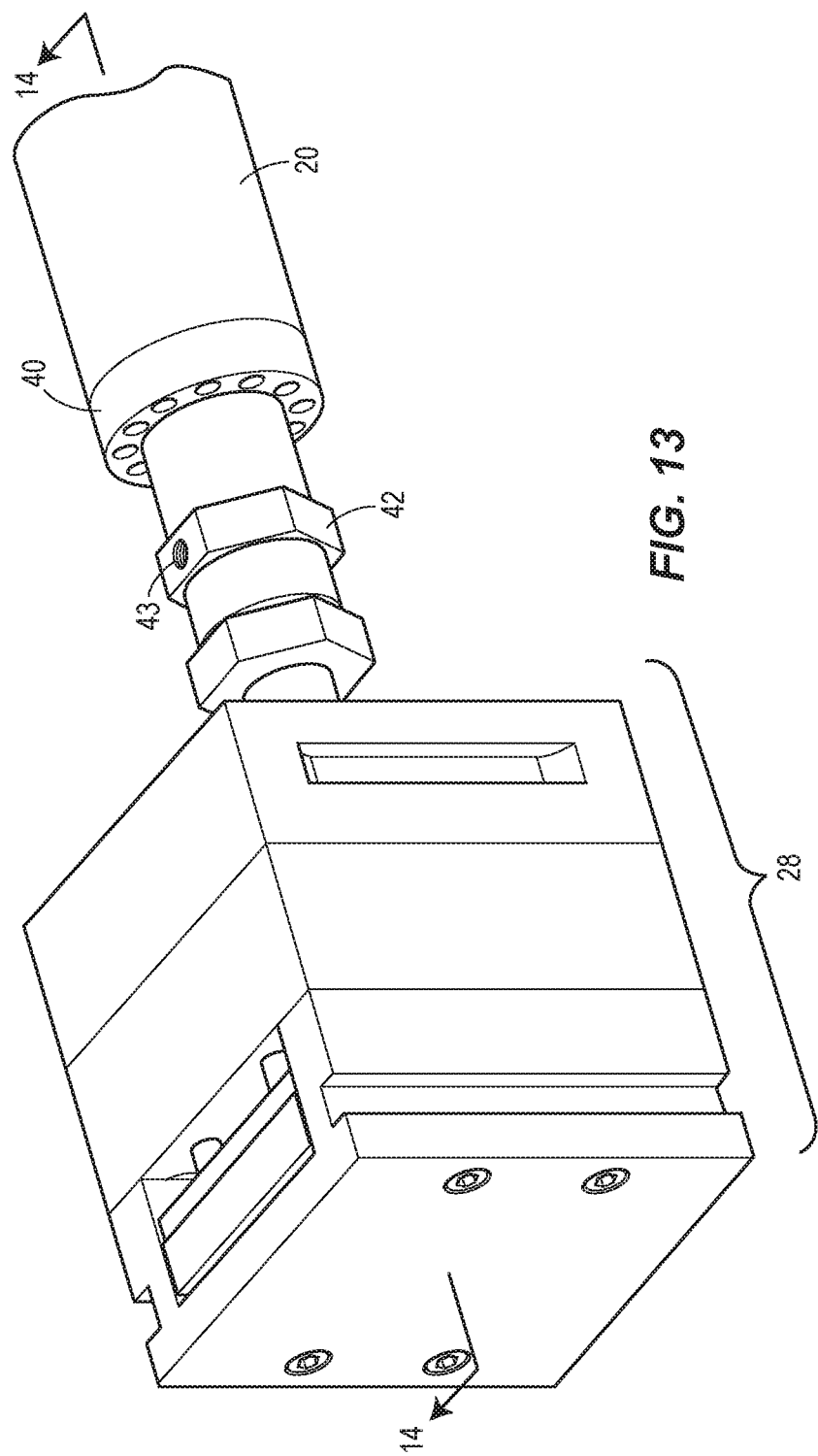
FIG. 13 is an orthogonal view of a portion of an injection system and a mold assembly of an injection molding system, including a porous metal vent sleeve of the present disclosure.
Figure 14:
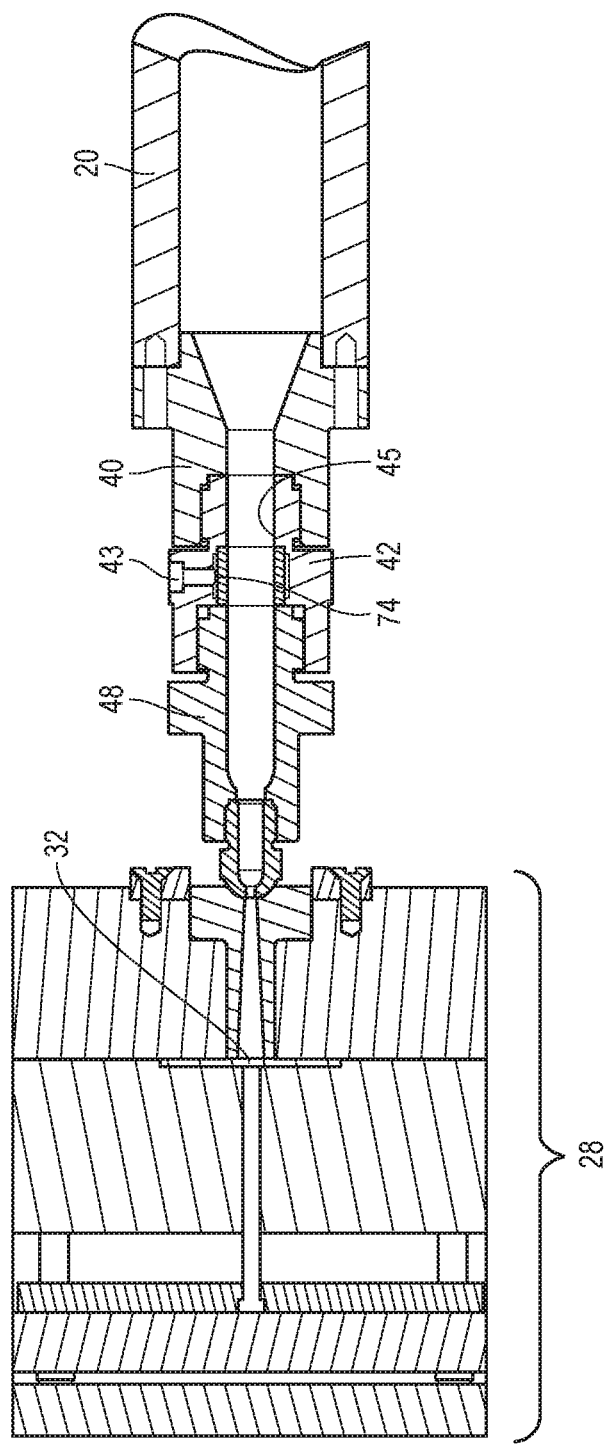
FIG. 14 is a cross-sectional view taken along lines 14-14 of FIG. 13.
Figure 15:
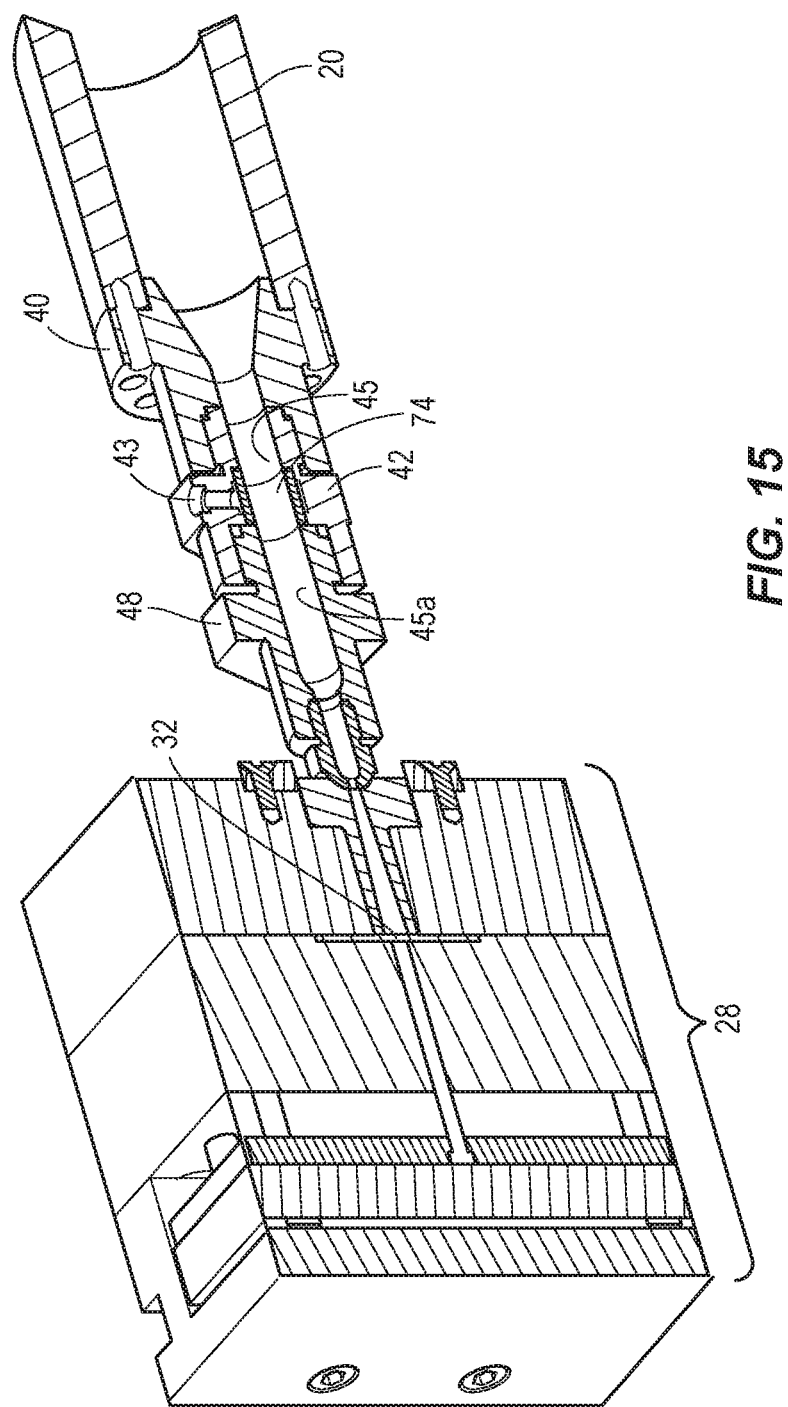
FIG. 15 is an orthogonal view of the cross-sectional view of FIG. 14.

Because the porous metal insert 44 is exposed to molten polymeric material, the polymeric material can clog the pores of the porous metal insert 44. In order to counteract clogging of the pores of the porous metal insert 44, a fluid source in the form of a blow-back module 62, such as illustrated in FIGS. 10-12, may be provided that connects to the vent aperture 43 of the nozzle adapter 42. The blow-back module 62 is connected to a cleaning agent supply, such as a pneumatic line 64 that provides air, nitrogen, or other suitable gas, under positive pressure, referred to herein generally as pressurized air, or alternately, may supply a degreaser or other cleaning agent or fluid in a liquid or hybrid gas/liquid phase, that the blow-back module utilizes to blow frozen polymeric material out of the pores of the porous metal insert 44, thereby unclogging the pores. The blow-back module 62 may be activated between every shot of the injection molding machine, or less frequently, depending on the propensity of the porous metal insert 44 to clog.

The blow-back module 62 includes a vent passage 63 that permits expulsion of gases from the flow channel 45 and through the porous metal insert 44. The blow-back module 62 may be provided with a valve (illustrated schematically in FIGS. 11 and 12) along the vent passage 63 to selectively place a branch 65 leading to the pneumatic line 64 in fluid communication with the portion of the vent passage 63 leading to the porous metal insert 44, while selectively closing the vent passage 63, to ensure the pressurized gas is directed toward the porous metal insert 44, rather than venting out of the vent passage 63 to the atmosphere.

Vent Sleeve

Turning to FIGS. 13-25, an injection molding system may be provided with an alternate form of porous metal insert to facilitate venting gases entrained in molten polymeric material upstream of the mold cavity. Like-numbered elements of the injection molding systems illustrated in FIGS. 1-12 represent corresponding structural components in the figures of FIGS. 13-25 of the present disclosure.

In the embodiments of FIGS. 13-25, the porous metal insert takes the form of a porous metal vent sleeve 74 that is positioned coaxially with the flow channel 45 of the nozzle adapter 42. Unlike the porous metal insert 44 of the embodiments illustrated in FIGS. 2-12, which has the form of a solid (albeit porous) slug, the porous metal vent sleeve 74 is a hollow cylindrical porous metal insert having a through-bore 75 therein. As used herein, the term "cylindrical" is not intended to be limited to having a circular shape in cross-section, but could be of round, oblong, oval, elliptical, triangular, square, rectangular, or other polygonal or curvoid shape in cross-section. The through-bore 75 of the vent sleeve 74 permits molten polymeric material to flow through the vent sleeve 74, whereas the pores of the porous metal vent sleeve 74 permit gases entrained in the molten polymeric material, i.e. flowing resin, to escape through the vent sleeve 74 and out the vent aperture 43 of the nozzle adapter 42, the vent aperture 43 being a passive vent port extending from an inlet at an exterior of the porous metal insert to an outlet at an exterior of the nozzle assembly (i.e., at an exterior of the nozzle adapter).

Figure 16:
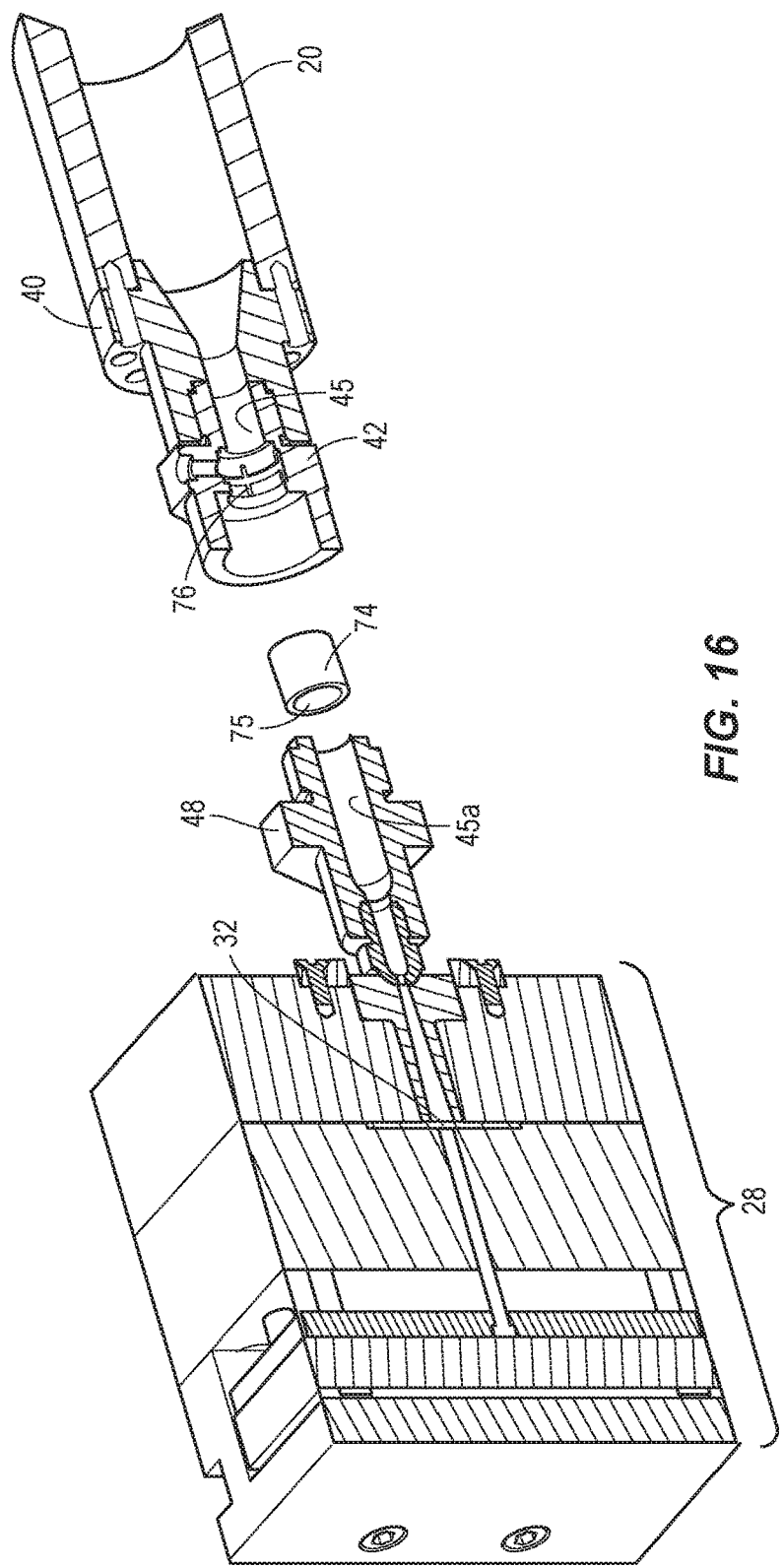
FIG. 16 is a partially-exploded view of the cross-sectional view of FIG. 15, illustrating an internal distribution manifold that allows circumferential venting through the porous metal vent sleeve.
Figure 17:
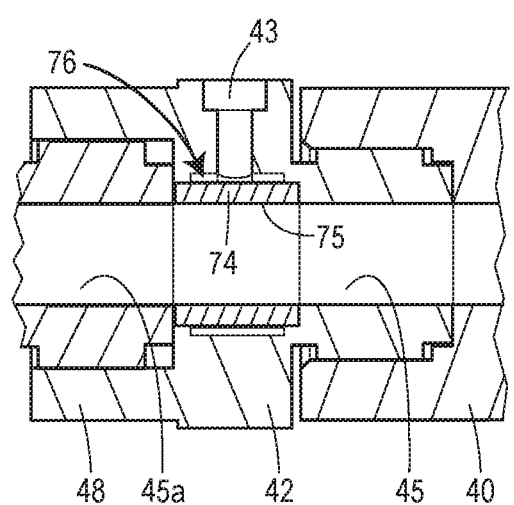
FIG. 17 is an enlarged cross-sectional view illustrating the porous vent sleeve of the present disclosure disposed coaxially with the flow channel of a nozzle adapter of the injection system.
Figure 18:
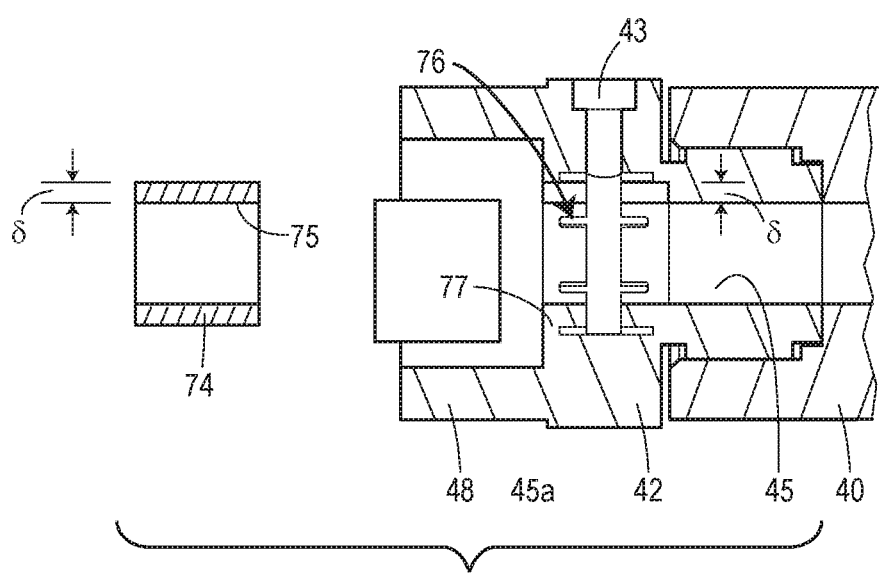
FIG. 18 is a partially exploded view of the cross-sectional view of FIG. 17, with the porous vent sleeve exploded out from the nozzle adapter.

To facilitate circumferential venting of gases from an exterior of the vent sleeve 74 to the vent aperture 43, an internal distribution manifold 76, such as illustrated in FIGS. 16-18, may be provided along a region, such as a radially-outwardly-stepped portion 77 of the flow channel 45 of the nozzle adapter 42 sized to receive the porous metal vent sleeve 74. The internal distribution manifold 76 may have a configuration or pattern different than that shown. Additionally or alternatively, the porous metal vent sleeve 74 itself may be provided with an external distribution manifold (not shown) that cooperates with, supplements, or supplants the internal distribution manifold 76. The radially-outwardly-stepped portion 77 is preferably of a diameter 26 greater than the diameter of the region of the flow channel 45 immediately upstream of the portion 77 occupied by the porous metal vent sleeve 74, where $\delta$=the thickness of the porous metal vent sleeve 74 measured from an exterior of the porous vent sleeve to an interior of the porous metal vent sleeve 74, i.e. to the hollow through-bore 75, so as to avoid introducing unwanted turbulence to the molten polymeric material as it passes through the flow channel 45 and through the through-bore as might be caused if the resin encountered a disruptive step, or change in diameter, when entering the through-bore 75 of the porous metal vent sleeve 74 from the flow channel 45.

Figure 19:
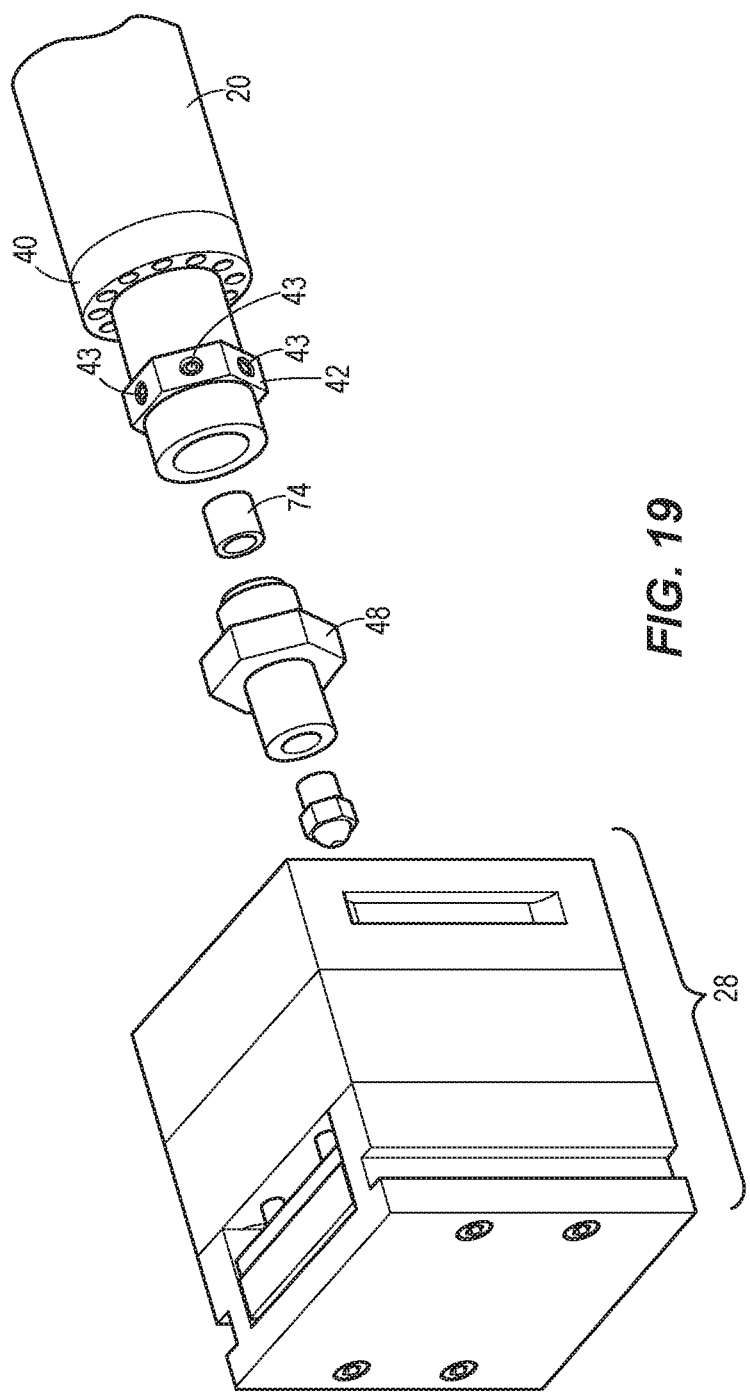
FIG. 19 is an exploded orthogonal view of the injection system and mold assembly of an injection molding system illustrated in FIG. 13.
Figure 20:
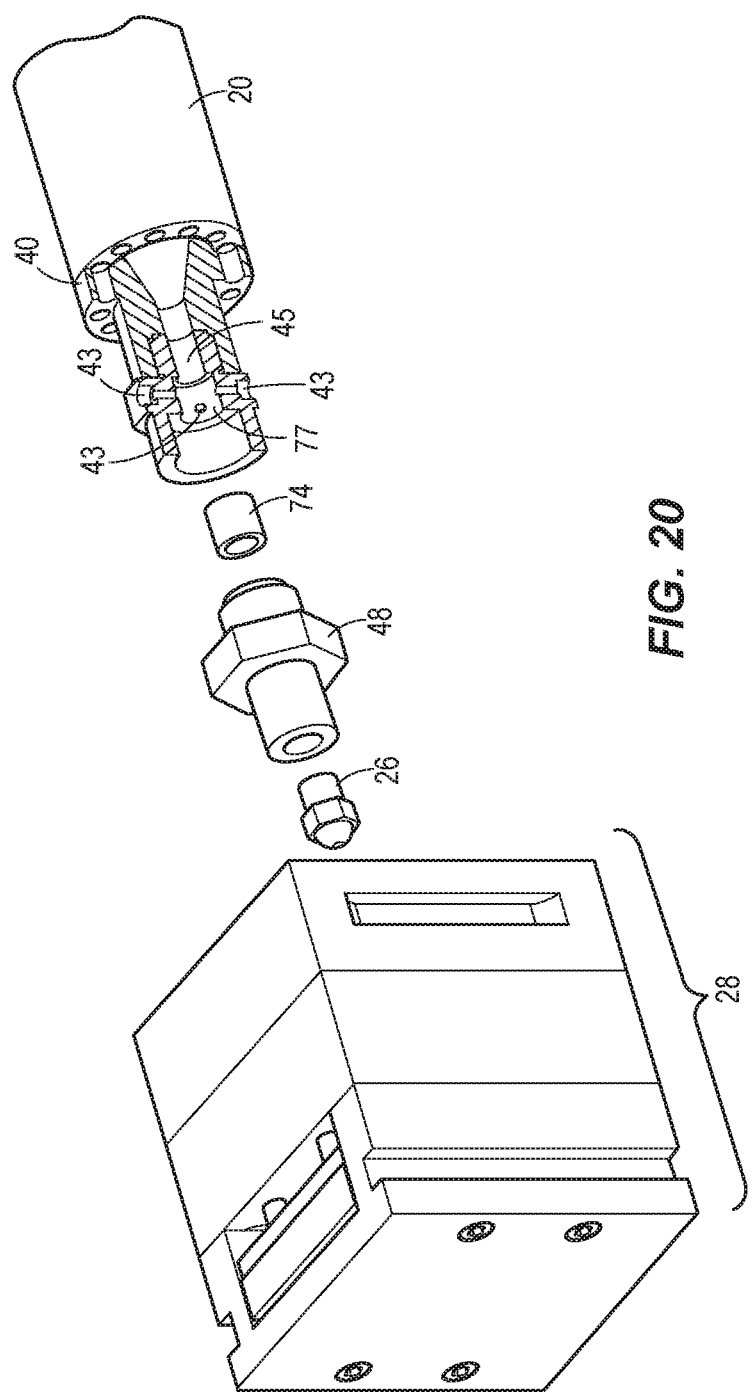
FIG. 20 is a partial cross-sectional view of a nozzle adapter similar to the one of the injection system of FIG. 16, but without an internal distribution manifold.
Figure 21:
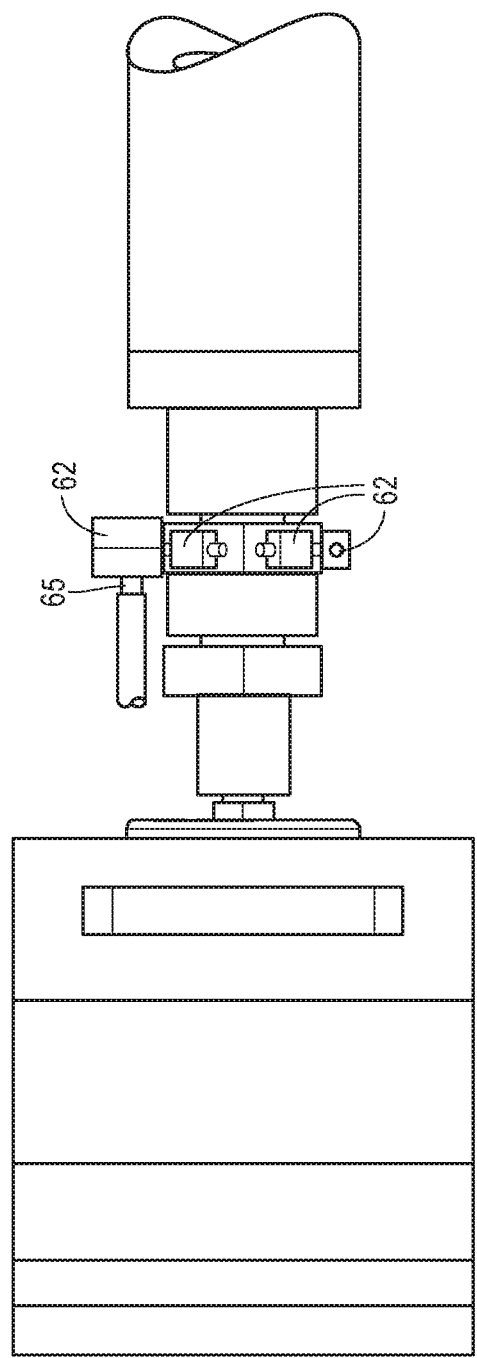
FIG. 21 is a front plan view of a portion of an injection system and a mold assembly of the injection molding system as illustrated in FIG. 20, with a plurality of blow-back modules associated with vent ports of the nozzle adapter for purging the porous metal insert between shots of the injection molding system.
Figure 22:
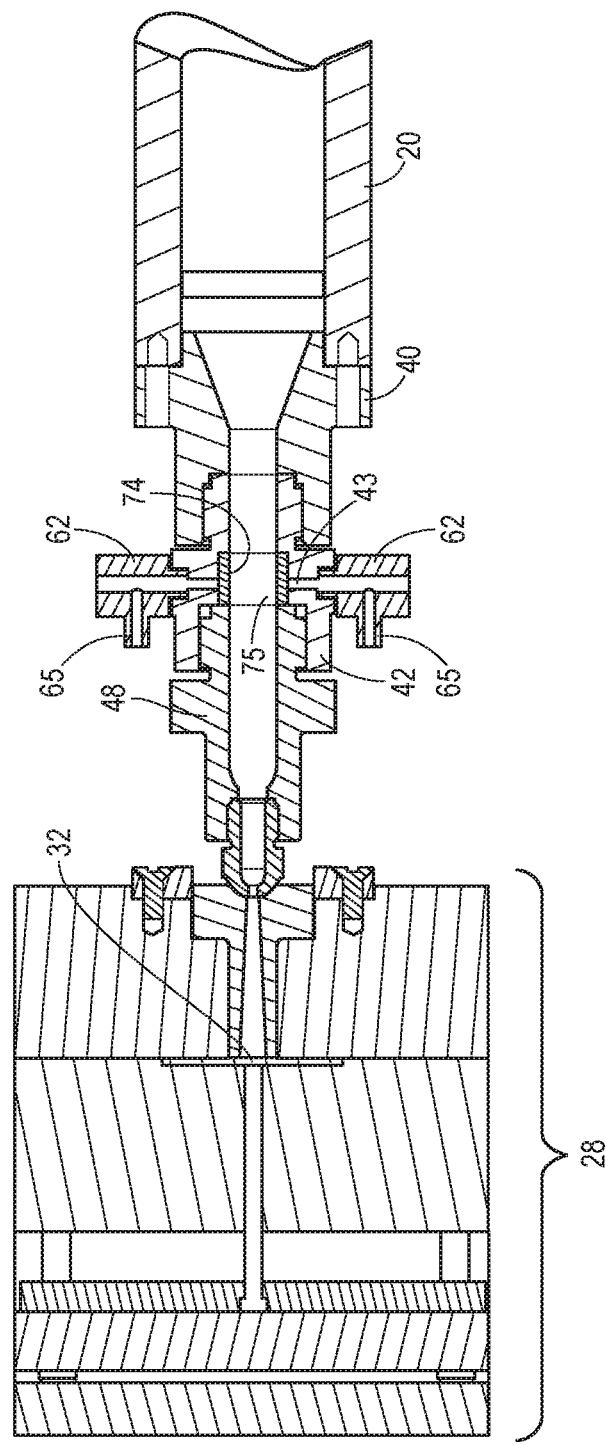
FIG. 22 is a cross-sectional view of the portion of the injection system and mold assembly illustrated in FIG. 21, with the porous vent sleeve and blow-back modules associated with vent ports of the nozzle adapter.
Figure 23:
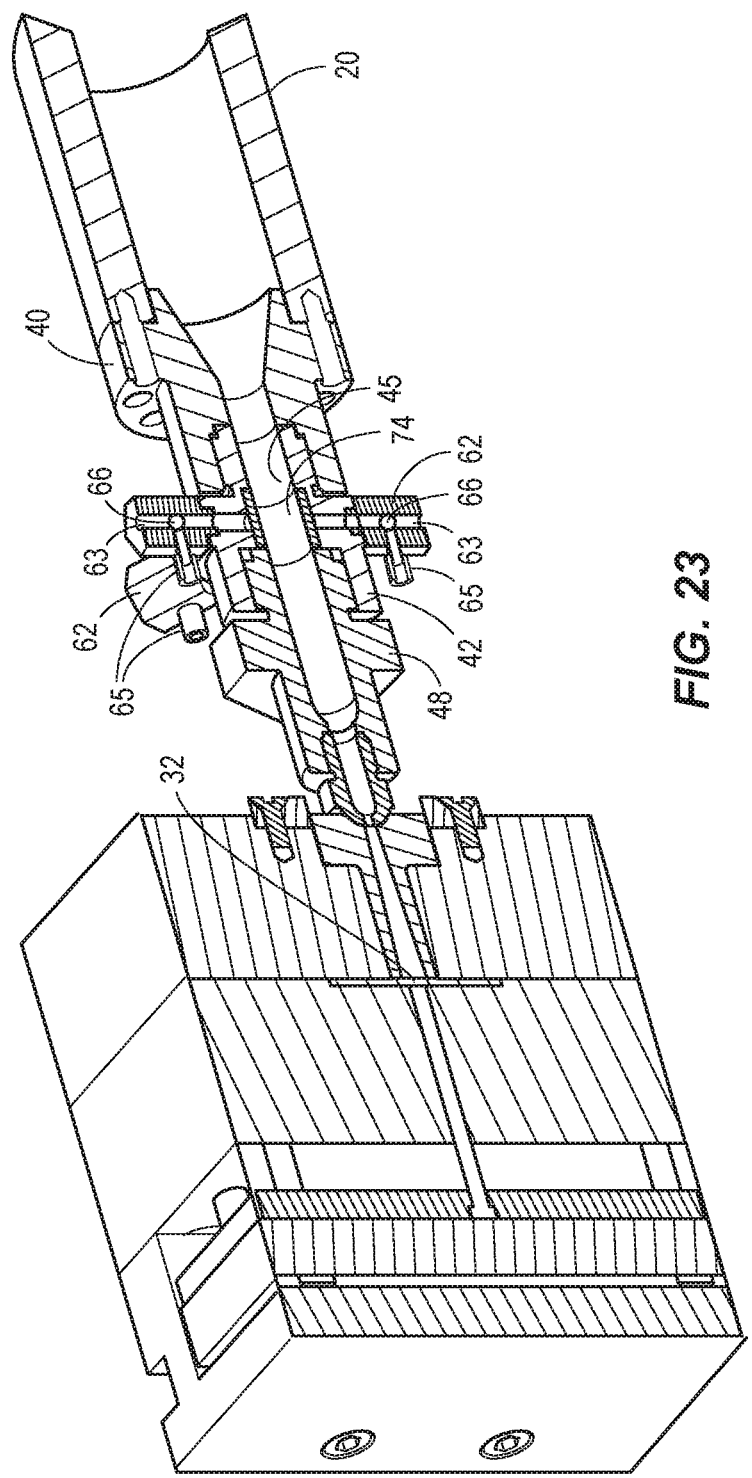
FIG. 23 is an orthogonal view of the cross-sectional view of FIG. 22.

As with the porous metal insert 44, the porous metal vent sleeve 74 is susceptible to clogging. To address this issue, it is desirable to provide one or more blow-back modules 62 at each of one or more vent apertures 43 that may be provided in the nozzle adapter 42 to introduce a fluid, such as air, nitrogen, a degreasing or other cleaning agent or solvent, in an effort to unclog pores of the porous metal insert 44 in situ, i.e. without having to dismantle the nozzle adapter 42 or other portions of the injection system. As illustrated in FIG. 19, the nozzle adapter 42 may be provided with a plurality of vent apertures 43 about its circumference. A plurality of vent apertures 43 can facilitate more circumferential venting of gases from the exterior of the vent sleeve 74, which may reduce the need for an internal distribution manifold 76 in the radially-outwardly-stepped portion 77 of the nozzle adapter 45, or an external distribution manifold in the vent sleeve 74.

Figure 24:
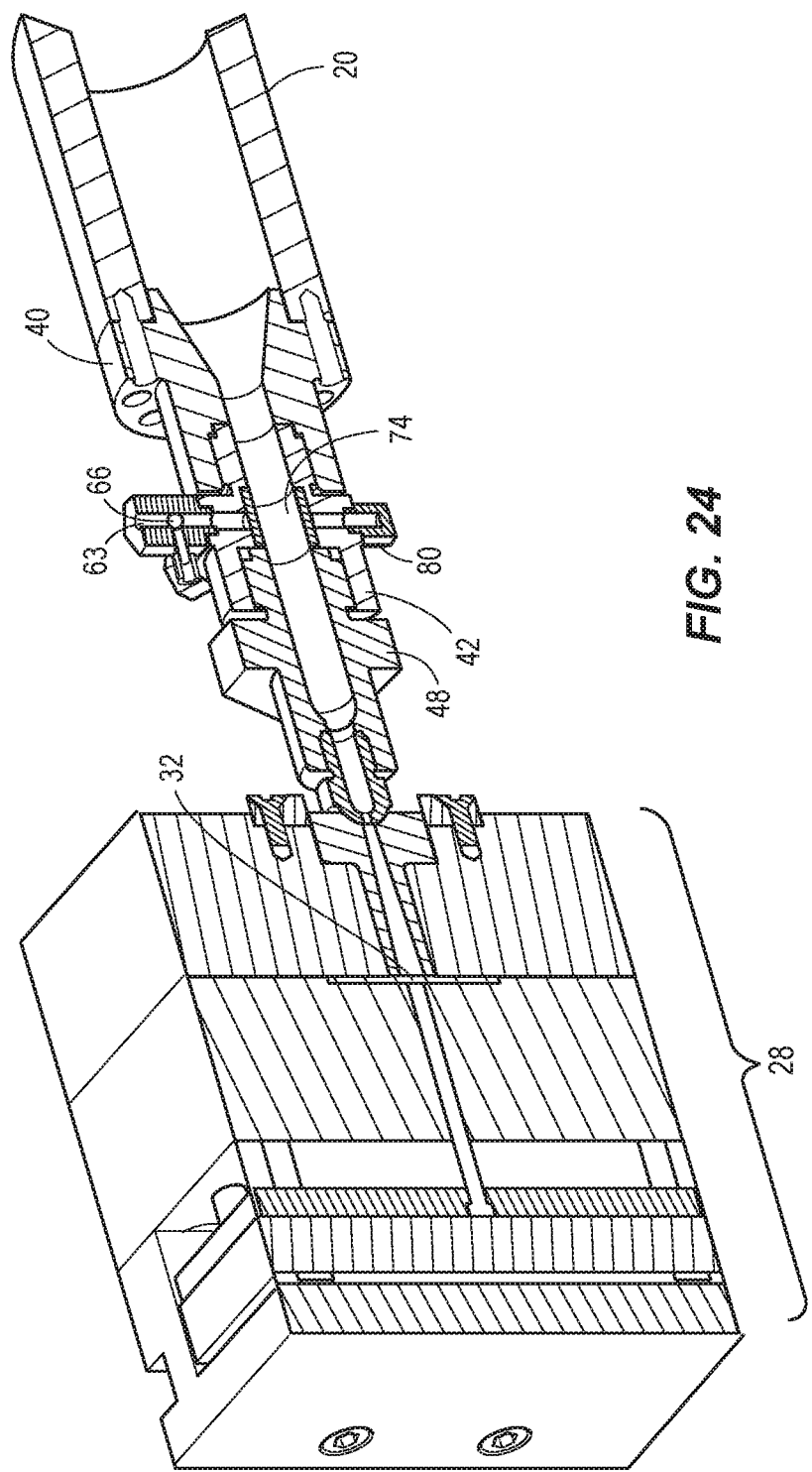
FIG. 24 is an orthogonal view of the portion of the injection system and mold assembly illustrated in FIG. 21, but with one of the blow-back modules replaced by a connection or chaining device.
Figure 25:
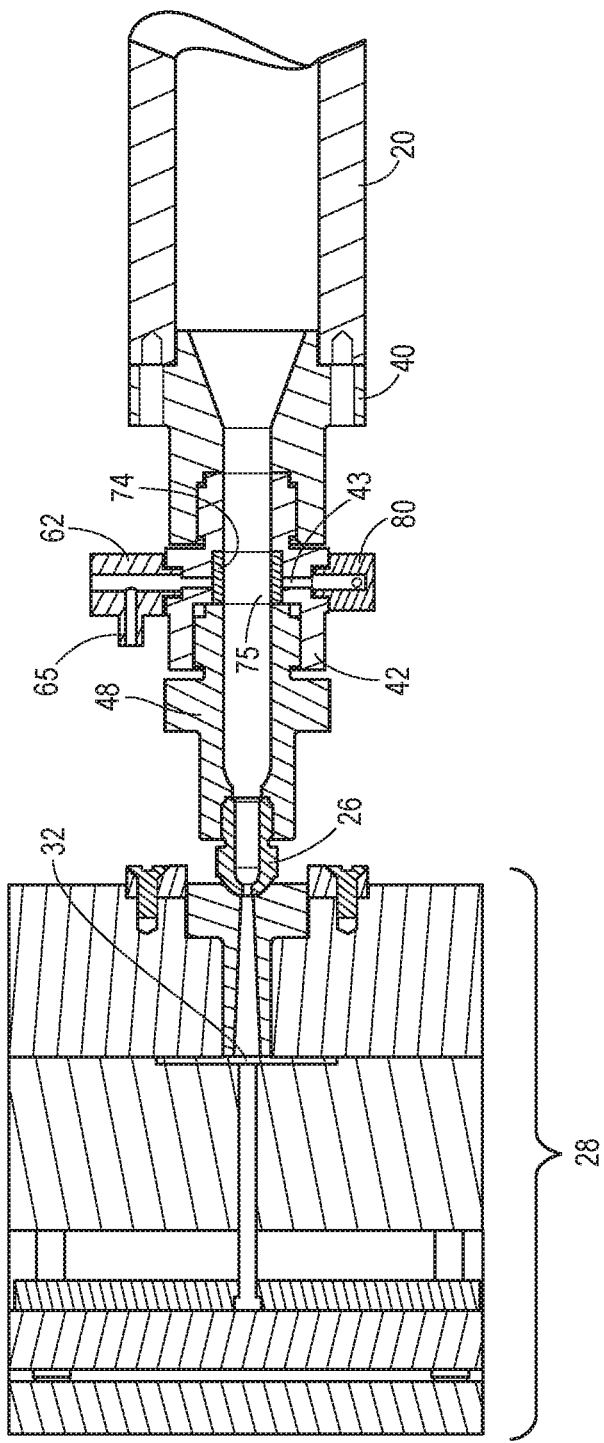
FIG. 25 is an enlarged cross-sectional view of the nozzle adapter with a vent sleeve, a blow-back valve, and a connection or chaining device.

As best illustrated in FIGS. 21-24, each of the plurality of vent apertures 43 may be provided with a blow-back module 62, which may have the same construction and principle of operation as described above with respect to the blow-back module illustrated in FIGS. 10-12. As illustrated in FIGS. 24 and 25, one or more of the blow-back modules may be replaced by a connection device or chaining device 80, that permits a plurality of blow-back modules to be daisy-chained together in series with pneumatic lines or air hoses (not shown).

While various embodiments are disclosed herein where the porous metal insert 44 is in a particular location of the injection system, namely within the nozzle adapter 42, various other locations for the one or more porous metal inserts 44 in an injection system 12 are considered within the scope of the appended claims. Any location intermediate the check ring 38 and the mold 28 that permits the one or more porous metal inserts 44 to be in fluid communication with the molten polymeric material from the barrel, and to vent gases entrained in the molten polymeric material through the porous metal inserts 44 and through one or more venting apertures to an exterior of the injection system 12, could be implemented in a manner consistent with, and within the scope of, the appended claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A nozzle assembly for an injection molding system, comprising:
    a first opening in selective fluid communication with a source of molten polymeric resin;
    a second opening in selective fluid communication with at least one of a mold cavity, a gate, a runner, or a manifold of an injection molding system;
    a flow channel intermediate, and in fluid communication with, the first and second openings;
    at least one passageway in a wall of the nozzle assembly intermediate the first and second opening, each of the at least one passageways extending from an inlet at the flow channel to an outlet at an exterior of the nozzle; and
    each of the at least one passageways having a porous metal insert disposed therein, each of the at least one passageways having a threaded wall, and each of the at least one passageways provided in the nozzle having a set screw received therein outboard of the porous metal insert disposed in the respective passageway to secure the porous metal insert within the passageway, each of the set screws having a vent hole therein, the nozzle assembly further comprising a fluid source in communication with the vent hole of each of the at least one set screws, the fluid source provided to selectively introduce a fluid through the porous metal insert secured by each of the respective at least one set screws.

2. A nozzle assembly for an injection molding system, comprising:
    a first opening in selective fluid communication with a source of molten polymeric resin;
    a second opening in selective fluid communication with at least one of a mold cavity, a gate, a runner, or a manifold of an injection molding system;
    a flow channel intermediate, and in fluid communication with, the first and second openings;
    at least one passageway in a wall of the nozzle assembly intermediate the first and second opening, each of the at least one passageways extending from an inlet at the flow channel to an outlet at an exterior of the nozzle; and
    each of the at least one passageways having a porous metal insert disposed therein, the nozzle assembly further comprising at least one fluid source, one of the at least one fluid sources in communication with the outlet of a respective one of the at least one passageways, each of the fluid sources provided to selectively introduce a fluid through the porous metal insert disposed in the respective passageway in a direction toward the inlet of the passageway.

3. The nozzle assembly of claim 1, the fluid being at least one of a group including pressurized air, pressurized nitrogen, a cleaning agent, a degreasing solvent, a propellant, and an alkaline washing agent.

* * * * *